United States Patent [19]
Takagi

[11] Patent Number: 5,663,789
[45] Date of Patent: Sep. 2, 1997

[54] RAY TRACING METHOD

[75] Inventor: Atsushi Takagi, Toyota, Japan

[73] Assignee: Toyota Jidosha Kabushiki Kaisha, Toyota, Japan

[21] Appl. No.: 616,455

[22] Filed: Mar. 15, 1996

[30] Foreign Application Priority Data

Mar. 16, 1995 [JP] Japan ................................ 7-057506

[51] Int. Cl.$^6$ .................................................. G01J 1/42
[52] U.S. Cl. ........................................ 356/121; 356/218
[58] Field of Search ..................... 356/121, 122, 356/123, 218, 219, 221, 226, 227; 362/238, 147, 296, 297, 346, 347, 431, 437

[56] References Cited

U.S. PATENT DOCUMENTS 5,426,500  6/1995  Ohana ...................................... 356/218

FOREIGN PATENT DOCUMENTS 4-88584  3/1992  Japan .
4-321215  11/1992  Japan .
6-215082  8/1994  Japan .
7-168953  7/1995  Japan .

OTHER PUBLICATIONS

Journal of the Illuminating Engineering Institut of Japan, *Lighting Equipmen for Automotive use*, vol. 76, No. 12, pp. 647-655 (The Illuminating Engineering Institute of Japan, Dec., 1992.

*Primary Examiner*—Hoa Q. Pham
*Attorney, Agent, or Firm*—Cushman, Darby & Cushman IP Group of Pillsbury Madison & Sutro LLP

[57] ABSTRACT

A ray tracing method including the steps of: emitting a ray from a viewpoint, which is set at a predetermined position, toward a lamp; ray tracing a ray which has been stochastically selected as a ray which reaches a light source of the lamp; and analyzing at least one of illuminance at a predetermined position on a surface illuminated by the lamp, luminance at a predetermined position on a surface of the lamp, and a color state of the lamp.

20 Claims, 3 Drawing Sheets

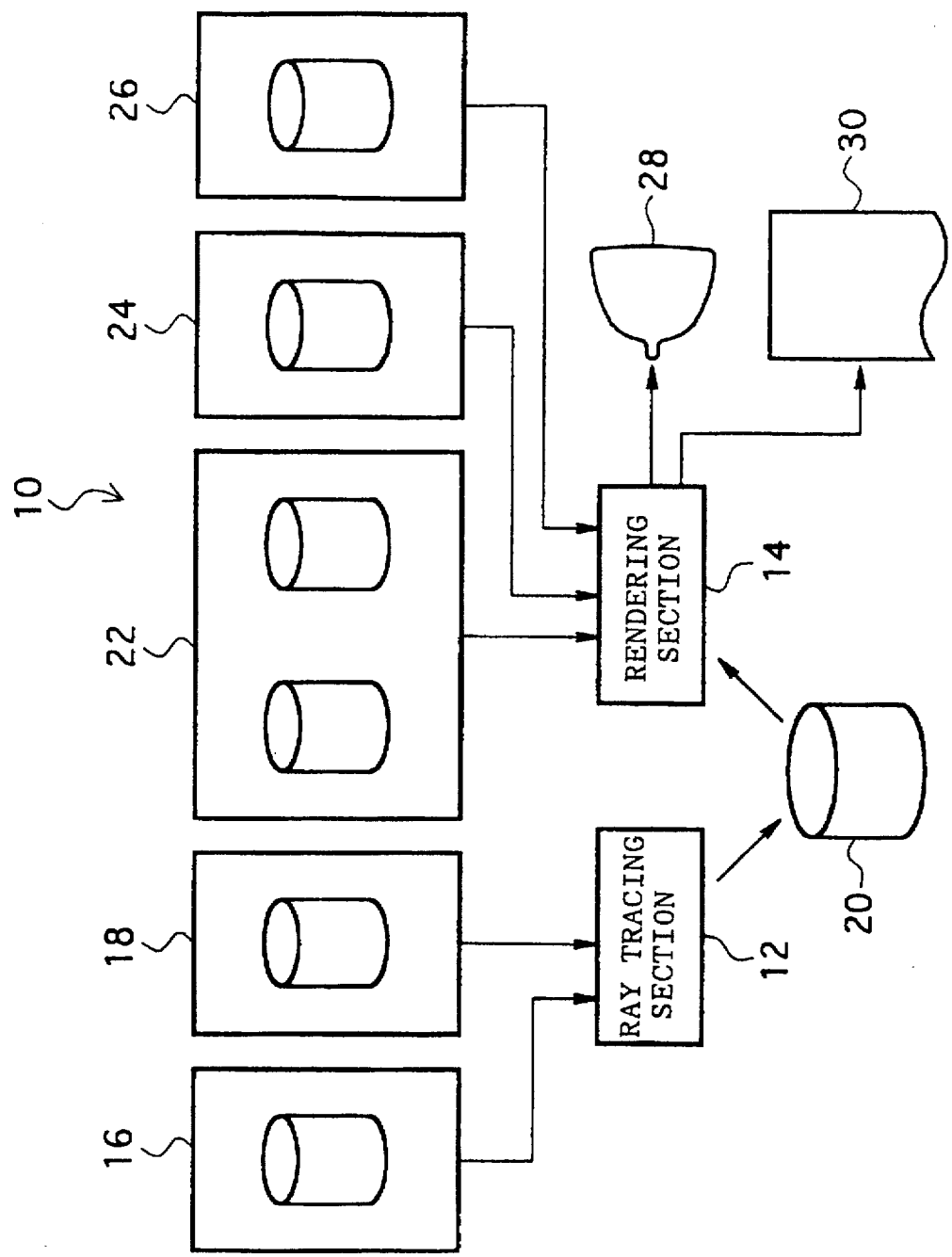

RAY TRACING METHOD

BACKGROUND OF THE INVENTION

1. Field of the Invention

The present invention relates to a ray tracing method, and in particular, a ray tracing method for an automobile headlight or the like.

2. Description of the Related Art

Conventionally, in the lamp of an automobile headlight or the like, first, a reflector which reflects light of a light source is formed. Thereafter, a ray is traced with the light source disposed at a predetermined position, and the position of the focal point of the lamp of the headlight or the like and the illuminance of the illuminated surface are computed (see "Journal of the Illuminating Engineering Institute of Japan", Vol. 76, No. 12, pp. 647-655).

However, because this method does not take into consideration the existence of a lens disposed in front of the light source, plural reflections or refractions between the lens and the reflector cannot be analyzed, and the illuminance cannot be computed accurately. Further, because the light is not considered from the point of view of spectrooptics, the color state of the lamp (more specifically, the perceived color of the lamp which is due to the effects of reflection and refraction caused by the configuration of the reflector and the cut configuration of the lens) cannot be analyzed accurately.

SUMMARY OF THE INVENTION

An object of the present invention is to provide a ray tracing method in which accurate computation of the illuminance of a surface illuminated by a lamp, accurate computation of the luminance of the lamp, and accurate analysis of the color state are possible.

A first aspect of the present invention is a ray tracing method for analyzing the illuminance of a predetermined position on a surface illuminated by a lamp, or the luminance of a predetermined position on a surface of the lamp, or the color state. The ray tracing method is characterized by emitting a ray toward the lamp from a viewpoint set at a predetermined position, and ray tracing a ray which has been stochastically selected as a ray which hits the light source of the lamp.

The first aspect of the present invention is a ray tracing method comprising the steps of: emitting a ray from a viewpoint, which is set at a predetermined position, toward a lamp; ray tracing a ray which has been stochastically selected as a ray which reaches a light source of the lamp; and analyzing at least one of illuminance at a predetermined position on a surface illuminated by the lamp, luminance at a predetermined position on a surface of the lamp, and a color state of the lamp.

A second aspect of the present invention is a ray tracing device in which, in the first aspect of the present invention, the ray tracing utilizes the Monte Carlo method, and stochastic selection of the ray which reaches the light source is used as a portion of a path of the Monte Carlo method.

A third aspect of the present invention is a ray tracing method comprising the steps of: emitting a ray from a viewpoint, which is set at a predetermined position, toward a lamp; ray tracing a ray which reaches a light source of the lamp by utilizing the Monte Carlo method and by utilizing a portion of a path of the Monte Carlo method for stochastic selection of the ray; and analyzing at least one of illuminance at a predetermined position on a surface illuminated by the lamp, luminance at a predetermined position on a surface of the lamp, and a color state of the lamp.

A fourth aspect of the present invention is a ray tracing method comprising the steps of: emitting a ray from a viewpoint, which is set at a predetermined position, toward a lamp; ray tracing a ray which reaches a light source of the lamp by utilizing the Monte Carlo method and by utilizing a portion of a path of the Monte Carlo method for stochastic selection of the ray; storing, in a storage device, results of the ray tracing which are expressed by a tree structure; and analyzing at least one of illuminance at a predetermined position on a surface illuminated by the lamp, luminance at a predetermined position on a surface of the lamp, and a color state of the lamp.

In accordance with the first aspect of the present invention, the ray which reaches the light source is ray traced with a plurality of reflections and refractions at the lens and the reflector taken into consideration. At least one of the illuminance at a predetermined position on a surface illuminated by the lamp, the luminance at a predetermined position on a lamp surface, and the color state are determined.

In accordance with the second aspect of the present invention, by utilizing the Monte Carlo method in ray tracing, computation of at least one of the illuminance at a predetermined position on a surface illuminated by the lamp, the luminance at a predetermined position on a lamp surface, and the color state is effected with a smaller amount of computation.

In accordance with the third aspect of the present invention, the ray which reaches the light source is ray traced by the Monte Carlo method with a plurality of reflections and refractions at the lens and the reflector taken into consideration. At least one of the illuminance at a predetermined position on a surface illuminated by the lamp, the luminance at a predetermined position on a lamp surface, and the color state is determined. Because ray tracing is carried out in accordance with the Monte Carlo method, the illuminance, luminance and color state can be determined with a smaller amount of computation.

In accordance with the fourth aspect of the present invention, the ray which reaches the light source is ray traced by the Monte Carlo method with a plurality of reflections and refractions at the lens and the reflector taken into consideration. At least one of the illuminance at a predetermined position on a surface illuminated by the lamp, the luminance at a predetermined position on the lamp surface, and the color state is determined. The results of the ray tracing are expressed by a tree structure, and the tree structure is stored in a storage device. Because ray tracing is carried out in accordance with the Monte Carlo method and the results thereof are stored in a tree structure, the illuminance, luminance and color state can be determined with a smaller amount of computation.

In the above-described aspects of the present invention, a ray is emitted toward a lamp from a viewpoint which is set at a predetermined position, and the ray which has been selected stochastically as the ray which reaches the light source of the lamp is ray traced. Therefore, a superior effect is achieved in that accurate computation of illuminance and luminance and accurate analysis of the color state are possible without limitless computation.

BRIEF DESCRIPTION OF THE DRAWINGS

FIG. 3 is a block diagram illustrating a computing device to which the ray tracing method of the embodiment of the present invention is applied.

DESCRIPTION OF THE PREFERRED EMBODIMENT

An embodiment of the ray tracing method of the present invention will be described in accordance with FIGS. 1 through 3.

As illustrated in FIG. 3, a computing device 10 of the present embodiment computes the position of the focal point and the illuminance of the headlight of an automobile.

The computing device 10 is provided with a ray tracing section 12 which effects ray tracing, and a rendering section 14 which effects coloring computation. The ray tracing section 12 is provided with a condition database 18 in which information regarding positional relationships between observation points and the headlight are recorded. The ray tracing section 12 is also provided with a configuration database 18 in which information regarding the configuration of the headlight is recorded.

The ray tracing section 12 reads information regarding the positional relationship of a viewpoint and the headlight from the condition database 18, reads information regarding the configuration of the headlight from the configuration database 18, and carries out ray tracing of a ray emitted from the viewpoint.

Figure 1:
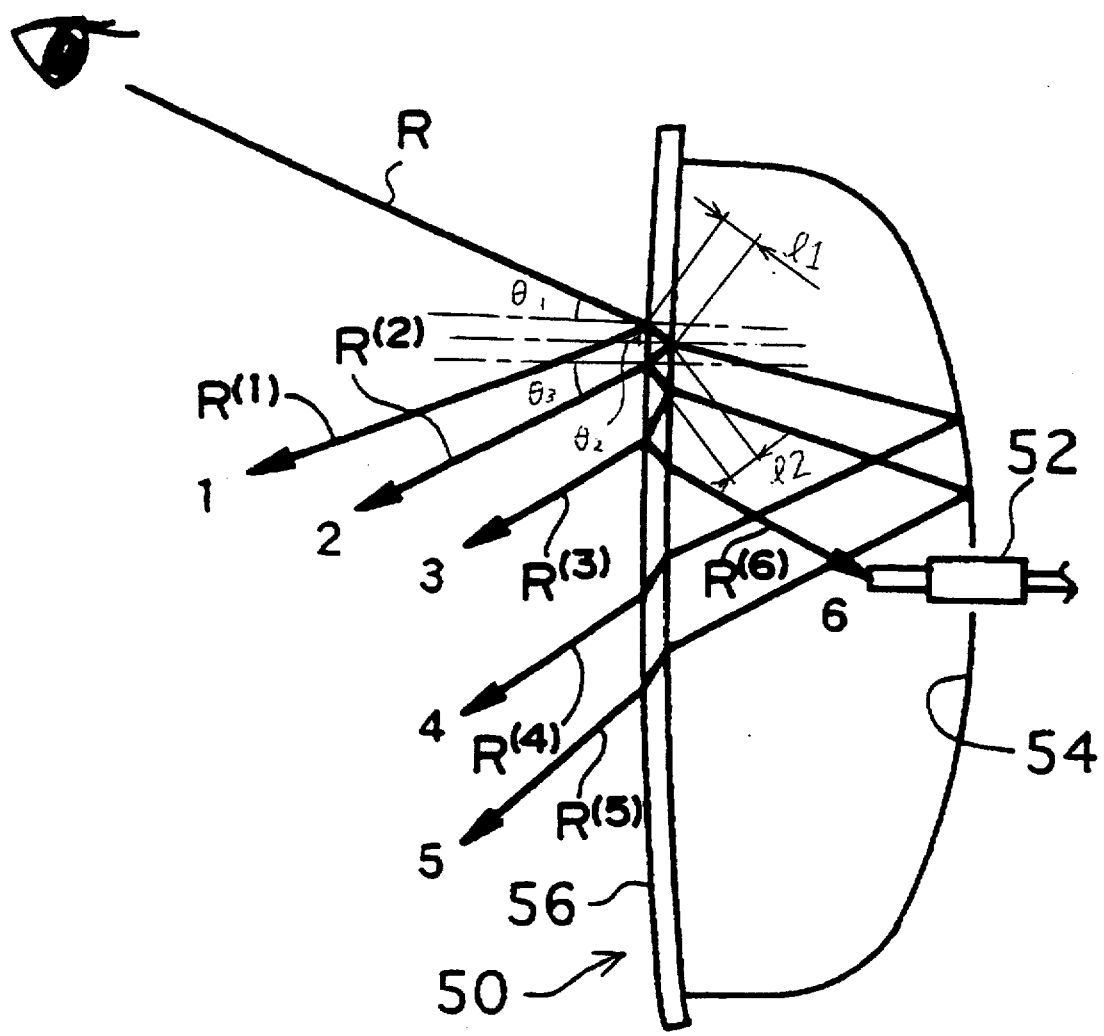
FIG. 1 is a schematic side sectional view illustrating a ray tracing method of an embodiment of the present invention.

As illustrated in FIG. 1, the headlight 50 is formed by a bulb 52 serving as a light source, a reflector 54 and a lens 58. When the tracing of a ray oriented toward a point of the headlight 50 from a viewpoint, which is separated from the headlight 50 by a predetermined distance, is drawn as a tree, the tree is as illustrated in FIG. 2.

Figure 2:
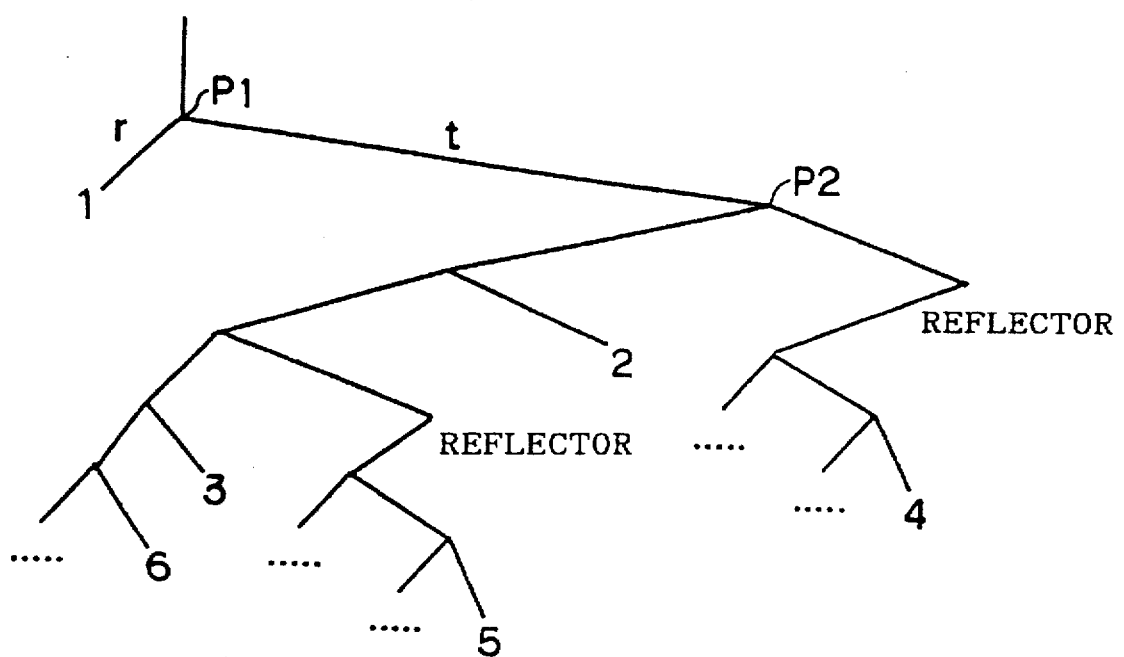
FIG. 2 is a view illustrating a tree of the ray tracing method of the embodiment of the present invention.

The branch points P1, P2 . . . of the tree shown in FIG. 2 correspond to boundary surfaces such as the lens surface, the reflector surface and the like.

The tree structure is prepared such that when light is transmitted from a branch point, the segment extends to the right in the drawing, whereas when light is reflected at a branch point, the segment extends to the left in the figure.

As illustrated in FIG. 3, the rendering section 14 includes a database 22 in which information regarding the reflectance and transmittance of the lens 56 and the reflector 54 are recorded. The rendering section 14 is also equipped with a bulb database 24 in which information regarding the light emitting characteristic of the bulb 52 is recorded. The rendering section 14 also includes an outdoor light database 26 in which background data is recorded.

The rendering section 14 reads the data of the tree structure prepared by the ray tracing section 12 from a ray tracing database 20, the information on the reflectance and transmittance of the lens 56 and the reflector 54 from the database 22, the information on the light emitting characteristic of the bulb 52 from the bulb database 24, and the background data from the outdoor light database 26, and effects coloring computation. The rendering section 14 outputs the results to a display 28 and a printer 30.

Next, operation of the present embodiment will be described.

As illustrated in FIG. 1, of the rays which are ray traced from the viewpoint, the only ray for which repeating reflections or refractions an infinite number of times at the lens 56 or between the lens 56 and the reflector 54 actually effects the way of viewing, is the ray which hits the bulb 52. Here, numbers 1, 2, 3 . . . are given to the ray which hits the bulb 52 and to rays branching off along the way from the viewpoint until that ray is reached. Accordingly, it suffices to compute only these rays. However, the actual structure of the headlight 50 is complicated, and there is no algorithm which reliably computes only the rays 1, 2, 3 . . . etc.

Here, principles of the Monte Carlo method are introduced to stochastically select and trace a ray without effecting ray beam tracing for all of the rays. A stochastically selected ray does not always hit the bulb 52, but work efficiency in this case is much better than ray tracing all of the rays. Further, tracing of the rays 1, 2, 3 . . . must be effected, and if this ray tracing is used as a portion of the path of the Monte Carlo method, tracing becomes more efficient.

The method of computation will be described hereinafter.

It is assumed that the observation ray in FIG. 1 is R and the rays 1, 2, 3 . . . are $R^{(1)}, R^{(2)}, R^{(3)}, \ldots$. Further, given that there are a total of, for example, $j_i$ nodes (branch points P1, P2 . . . ) from R until $R^{(i)}$ is reached, the attenuation factors of the respective nodes are defined as $f^{(i)}, f_2^{(i)}, f_3^{(i)}, \ldots$.

Taking ray $R^{(2)}$ in FIG. 1 as an example, when ray $R^{(2)}$ is traced from the viewpoint, $R^{(2)}$ passes through the lens surface, reflects off the reverse surface of the lens, and passes through the lens surface. The respective attenuation factors at this time are as follows.

$$f_1^{(2)} = t(\theta_1)$$

$$f_2^{(2)} = e^{-cl_1} r(\theta_2)$$

$$f_3^{(2)} = e^{-cl_2} r(\theta_3)$$

Here, $\theta_1, \theta_2, \theta_3$ are respectively the angles of incidence at the lens surface, the lens reverse surface, and the lens surface, c is the attenuation coefficient within the lens, $r(\theta)$ is the Fresnel reflectance at an angle of incidence of $\theta$, and $t(\theta) = 1 - r(\theta)$. Further, l1 and l2 are the distances over which the ray travels from the lens surface to the lens reverse surface and from the lens reverse surface to the lens surface, respectively. Accordingly, $e^{-cl_1}$ and $e^{-cl_2}$ respectively denote the attenuation during the time that the ray progresses within the lens.

The following factors contribute to the luminance I of the ray $R^{(2)}$.

$$f_1^{(2)}, f_2^{(2)}, f_3^{(2)}, f_4^{(2)}$$

Accordingly, because the luminance I of the observation ray R is the sum of all of the contributions, I may be defined by following formula (1).

$$I = \sum_i (f_1^{(i)} f_2^{(i)} \ldots f_{j_i}^{(i)} \cdot I^{(i)}) \tag{1}$$

When the path tracing the ray from the observation ray R to the ray $R^{(i)}$ is considered, the probabilities of the ray following that path at each node are defined as $p_1^{(i)}, p_2^{(i)} \ldots p_{j_i}^{(i)}$.

At this time, the luminance I of the observation ray R is as per following formula (2).

$$I = \sum_i (f_1^{(i)} f_2^{(i)} \ldots f_{ji}^{(i)} \cdot I^{(i)}) \quad (2)$$

$$= \sum_i \left( \frac{f_1^{(i)} f_2^{(i)} \ldots f_{ji}^{(i)} \cdot I^{(i)}}{p_1^{(i)} p_2^{(i)} \ldots p_{ji}^{(i)}} p_1^{(i)} p_2^{(i)} \ldots p_{ji}^{(i)} \right)$$

The probabilities relate to following formula (3).

$$\sum_i p_1^{(i)} p_2^{(i)} \ldots p_{ji}^{(i)} = 1 \quad (3)$$

Therefore, formula (2) is the average value $E[X^{(i)}]$ of following formula (4).

$$X^{(i)} = \frac{f_1^{(i)} f_2^{(i)} \ldots f_{ji}^{(i)} \cdot I^{(i)}}{p_1^{(i)} p_2^{(i)} \ldots p_{ji}^{(i)}} \quad (4)$$

Accordingly, by the principles of the Monte Carlo method, formula (2) is approximately equal to the average value of the variables $X^{(s)}$ in a sample path $p_1^{(s)} \to p_2^{(s)} \to \ldots \to p_{js}^{(s)}$.

Therefore, an approximate value of the luminance I is obtained by formula (5).

$$I \approx E[X^{(i)}] \quad (5)$$

$$\approx \frac{1}{L} \sum_{s=1}^{L} X^{(s)}$$

Considering that the luminance I of the observation ray R and the attenuation factor $f_i^{(j)}$ are functions of the wavelength $\lambda$, if the luminance I and the attenuation factor $f_i^{(j)}$ are substituted by the spectral radiance $I(\lambda)(W.sr^{-1}m^{-1}.nm^{-1})$ and the spectral attenuation factor $f_i^{(j)}(\lambda)$, following formula (6) is obtained.

$$I(\lambda) = \frac{1}{L} \sum_{s=1}^{L} X^{(s)}(\lambda) \quad (6)$$

At this time, $X^{(s)}(\lambda)$ is as per following formula (7).

$$X^{(s)}(\lambda) = \frac{f_1^{(s)}(\lambda) f_2^{(s)}(\lambda) \ldots f_{js}^{(s)}(\lambda) \cdot I^{(s)}(\lambda)}{p_1^{(s)} p_2^{(s)} \ldots p_{js}^{(s)}} \quad (7)$$

On the basis of formulae (6) and (7), tristimulus values (X, Y, Z) of $I(\lambda)$ are determined from formula (8).

$$\begin{pmatrix} X \\ Y \\ Z \end{pmatrix} = \frac{1}{k} \int I(\lambda) \begin{pmatrix} \bar{x}(\lambda) \\ \bar{y}(\lambda) \\ \bar{z}(\lambda) \end{pmatrix} d\lambda \quad (8)$$

$$= \frac{1}{k} \int \frac{1}{L} \sum_{s=1}^{L} \left( \frac{f_1^{(s)}(\lambda) f_2^{(s)}(\lambda) \ldots f_{js}^{(s)}(\lambda) \cdot I^{(s)}(\lambda)}{p_1^{(s)} p_2^{(s)} \ldots p_{js}^{(s)}} \right) \begin{pmatrix} \bar{x}(\lambda) \\ \bar{y}(\lambda) \\ \bar{z}(\lambda) \end{pmatrix} d\lambda$$

Here, $\bar{x}(\lambda)$, $\bar{y}(\lambda)$, $\bar{z}(\lambda)$ are color matching functions, and k is a constant determined by formula (9).

$$k = \int I(\lambda) \bar{y}(\lambda) d\lambda \quad (9)$$

In a case in which the spectral attenuation factor $f_i^{(j)}(\lambda)$ does not depend on the wavelength, such as a case in which the lens is achromatic and transparent, formula (8) can be transformed into formula (10).

$$\begin{pmatrix} X \\ Y \\ Z \end{pmatrix} = \frac{1}{k} \frac{1}{L} \sum_{s=1}^{L} \left[ \left( \frac{f_1^{(s)} f_2^{(s)} \ldots f_{js}^{(s)}}{p_1^{(s)} p_2^{(s)} \ldots p_{js}^{(s)}} \right) \int I^{(s)}(\lambda) \begin{pmatrix} \bar{x}(\lambda) \\ \bar{y}(\lambda) \\ \bar{z}(\lambda) \end{pmatrix} d\lambda \right] \quad (10)$$

$$= \frac{1}{k} \frac{1}{L} \sum_{s=1}^{L} \left[ \left( \frac{f_1^{(s)} f_2^{(s)} \ldots f_{js}^{(s)}}{p_1^{(s)} p_2^{(s)} \ldots p_{js}^{(s)}} \right) Ipre. \right]$$

This means that formula (10) can be computed in a short time by carrying out the computation of following formula (11) in advance.

$$Ipre. = \int I^{(s)}(\lambda) \begin{pmatrix} \bar{x}(\lambda) \\ \bar{y}(\lambda) \\ \bar{z}(\lambda) \end{pmatrix} d\lambda \quad (11)$$

Further, because reflection and transmission usually occur with equal probabilities, $p_i^{(j)}$ is as per following formula (12). Formula (10) thereby becomes formula (13).

$$p_i^{(j)} = \frac{1}{2} \quad (\forall i,j) \quad (12)$$

$$\begin{pmatrix} X \\ Y \\ Z \end{pmatrix} = \frac{1}{k} \frac{1}{L} \sum_{s=1}^{L} [2^{js} f_1^{(s)} f_2^{(s)} \ldots f_{js}^{(s)} \cdot Ipre.] \quad (13)$$

If the tristimulus values (X, Y, Z) are determined, the results of computation can be displayed in accurate colors on a CRT monitor or the like by using the color graphics device disclosed in Japanese Patent Application Laid-Open No. 4-88584 to the inventors of the present invention.

More effective computation can be effected by selecting in advance a path tracing a ray having a high probability of hitting the bulb 52 and by also using these results of computation.

For example, given that the paths of aforementioned rays 1, 2, 3 ... are repeatedly reflected and refracted a plural number of times within the lens 56, and that reflection is represented by R and transmission is represented by T, the paths of the rays are R, TRT, TRRRT .... For example, TRT means that a ray is traced from the observation ray R in the order of transmission, reflection, transmission.

Accordingly, if the calculation of formula (7) for these paths is used in following formula (14), $$I'(\lambda) = \sum_{s'=1}^{L'} X^{(s')}(\lambda) \quad (14)$$

computation is effected by using formula (15) in place of formula (6).

$$I = \frac{1}{L+L'} \left( \sum_{s=1}^{L} X^{(s)}(\lambda) + \sum_{s'=1}^{L'} X^{(s')}(\lambda) \right) \quad (15)$$

In this way, computation in which the probability of hitting the bulb 52 is higher can be carried out.

In the computing device 10, the results of the ray tracing described above are stored in the ray tracing database 20 illustrated in FIG. 3. Namely, a tree structure from the parent node which is the first node until the respective final end nodes are reached is stored in the ray tracing database 20.

The rendering section 14 reads the tree structure from the ray tracing database 20, the information regarding the reflectance and the transmittance of the lens 56 and the reflector 54 from the database 22, the information regarding the light emitting characteristic of the bulb 52 from the bulb database 24, and the background data from the outdoor light database 26, and effects color computation. The rendering section 14 outputs these results to the display 28 and the printer 30.

In the present embodiment, by changing the recordings of the database 22, the bulb database 24 and the outdoor light database 26, the color computation results of the headlight 50 at various types of lenses, reflectors, bulbs and backgrounds can be obtained without effecting ray tracing again.

Moreover, the above description is of an example in which the ray tracing method of the present invention is applied to a headlight. However, the ray tracing method of the present invention is applicable to all lights formed by a lens, a reflector and a bulb, such as colored rear combination lamps, and indicator lights and signal lights other than those of automobiles.

What is claimed is:

1. A ray tracing method comprising the steps of:
   emitting a ray from a viewpoint, which is set at a predetermined position, toward a lamp;
   ray tracing a ray which has been stochastically selected as a ray which reaches a light source of the lamp; and
   analyzing at least one of illuminance at a predetermined position on a surface illuminated by the lamp, luminance at a predetermined position on a surface of the lamp, and a color state of the lamp.

2. A ray tracing method according to claim 1, wherein said ray tracing utilizes the Monte Carlo method, and stochastic selection of the ray which reaches the light source is used as a portion of a path of the Monte Carlo method.

3. A ray tracing method according to claim 2, wherein results of said ray tracing are expressed by a tree structure and the tree structure is stored in a storage device.

4. A ray tracing method according to claim 1, wherein said ray tracing is effected by utilizing information regarding a positional relationship of the viewpoint and the lamp.

5. A ray tracing method according to claim 1, wherein said ray tracing is effected by utilizing information regarding a configuration of the lamp.

6. A ray tracing method according to claim 1, wherein said analyzing is effected by utilizing results of said ray tracing which are expressed by a tree structure, in a case in which computation of the color state is effected.

7. A ray tracing method according to claim 6, wherein said computation of the color state is effected by utilizing information regarding reflectance and transmittance of a lens and a reflector of the lamp.

8. A ray tracing method according to claim 6, wherein said computation of the color state is effected by utilizing information regarding a light emitting characteristic of a bulb provided in the lamp.

9. A ray tracing method according to claim 6, wherein said computation of the color state is effected by utilizing background data.

10. A ray tracing method comprising the steps of:
    emitting a ray from a viewpoint, which is set at a predetermined position, toward a lamp;
    ray tracing a ray which reaches a light source of the lamp by utilizing the Monte Carlo method and by utilizing a portion of a path of the Monte Carlo method for stochastic selection of the ray; and
    analyzing at least one of illuminance at a predetermined position on a surface illuminated by the lamp, luminance at a predetermined position on a surface of the lamp, and a color state of the lamp.

11. A ray tracing method according to claim 10, wherein results of said ray tracing are expressed by a tree structure and the tree structure is stored in a storage device.

12. A ray tracing method according to claim 10, wherein said ray tracing is effected by utilizing information regarding a positional relationship of the viewpoint and the lamp.

13. A ray tracing method according to claim 10, wherein said ray tracing is effected by utilizing information regarding a configuration of the lamp.

14. A ray tracing method according to claim 10, wherein said analyzing is effected by utilizing results of said ray tracing which are expressed by a tree structure, in a case in which computation of the color state is effected.

15. A ray tracing method according to claim 14, wherein said computation of the color state is effected by utilizing information regarding reflectance and transmittance of a lens and a reflector of the lamp.

16. A ray tracing method according to claim 14, wherein said computation of the color state is effected by utilizing information regarding a light emitting characteristic of a bulb provided in the lamp.

17. A ray tracing method according to claim 14, wherein said computation of the color state is effected by utilizing background data.

18. A ray tracing method comprising the steps of:
    emitting a ray from a viewpoint, which is set at a predetermined position, toward a lamp;
    ray tracing a ray which reaches a light source of the lamp by utilizing the Monte Carlo method and by utilizing a portion of a path of the Monte Carlo method for stochastic selection of the ray;
    storing, in a storage device, results of said ray tracing which are expressed by a tree structure; and
    analyzing at least one of illuminance at a predetermined position on a surface illuminated by the lamp, luminance at a predetermined position on a surface of the lamp, and a color state of the lamp.

19. A ray tracing method according to claim 18, wherein said ray tracing is effected by utilizing at least one of information regarding a positional relationship of the viewpoint and the lamp and information regarding a configuration of the lamp.

20. A ray tracing method according to claim 18, wherein in a case in which computation of the color state is effected, said analyzing is effected by utilizing results of said ray tracing which are expressed by a tree structure, and at least one of information regarding reflectance and transmittance of a lens and a reflector of the lamp, information regarding a light emitting characteristic of a bulb provided in the lamp, and background data.

* * * * *